(12) United States Patent
Masuda et al.

(10) Patent No.: US 7,871,665 B2
(45) Date of Patent: Jan. 18, 2011

(54) PROCESS FOR PRODUCING POLARIZING FILM, POLARIZING FILM, POLARIZING PLATE, OPTICAL FILM, AND IMAGE DISPLAY

(75) Inventors: Tomoaki Masuda, Ibaraki (JP); Kazuki Tsuchimoto, Ibaraki (JP); Yutaka Fujita, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1157 days.

(21) Appl. No.: 10/581,610

(22) PCT Filed: Jul. 25, 2005

(86) PCT No.: PCT/JP2005/013554
§ 371 (c)(1),
(2), (4) Date: Jun. 5, 2006

(87) PCT Pub. No.: WO2006/011436
PCT Pub. Date: Feb. 2, 2006

(65) Prior Publication Data
US 2007/0111017 A1    May 17, 2007

(30) Foreign Application Priority Data
Jul. 28, 2004  (JP) .............................. 2004-220295

(51) Int. Cl.
G02B 1/10 (2006.01)
(52) U.S. Cl. .................................................. 427/163.1
(58) Field of Classification Search .................. 427/162
See application file for complete search history.

(56) References Cited

U.S. PATENT DOCUMENTS

| | | | | |
|---|---|---|---|---|
| 5,071,906 A | * | 12/1991 | Tanaka et al. | 524/557 |
| 2003/0137732 A1 | * | 7/2003 | Sugino et al. | 359/491 |
| 2005/0271873 A1 | * | 12/2005 | Kameyama et al. | 428/343 |

FOREIGN PATENT DOCUMENTS

| | | | |
|---|---|---|---|
| JP | 7-134210 A | | 5/1995 |
| JP | 2005-114990 A | | 4/2005 |
| JP | 2005-202386 A | | 7/2005 |
| WO | WO 2004/013667 | * | 2/2004 |
| WO | WO 2004/013667 A1 | | 2/2004 |

OTHER PUBLICATIONS

International Search Report mailed Sep. 20, 2005 of International Application PCT/JP2005/013554.

* cited by examiner

*Primary Examiner*—Timothy H Meeks
*Assistant Examiner*—Elizabeth Burkhart
(74) *Attorney, Agent, or Firm*—Westerman, Hattori, Daniels & Adrian, LLP

(57) ABSTRACT

The present invention pertains to a method of fabricating a polarizing film by uniaxially stretching a resin film such as a polyvinyl alcohol-based film in a fabrication process including a swelling step and a dyeing step following the swelling step, comprising the steps of immersing a resin film in bath liquids in at least two or more swelling baths in sequence in the above-mentioned swelling step, wherein at least a bath temperature of a swelling bath located at a Nth position from the front-stage side is set at a temperature which is higher than a bath temperature of a swelling bath located at a (N+M)th position by 3° C. or more (both N and M are specified positive integers).

8 Claims, 2 Drawing Sheets

△ Comparative Example 1: 28°C single bath process
× Comparative Example 2: 40°C single bath process
□ Comparative Example 3: 50°C single bath process
○ Example 1: 40°C for 21 seconds and second bath at 28°C
● Example 2: 50°C for 21 seconds and second bath at 28°C

PROCESS FOR PRODUCING POLARIZING FILM, POLARIZING FILM, POLARIZING PLATE, OPTICAL FILM, AND IMAGE DISPLAY

TECHNICAL FIELD

The present invention relates to a method of fabricating a polarizing film which is useful as a material of a polarizer constituting a liquid crystal display, a polarizer and an optical film including a polarizing film fabricated using this method of fabricating, and an image display device, such as a liquid crystal display, including this polarizer or optical film.

BACKGROUND ART

At present, image display devices which office automation equipment such as a television set and a desktop personal computer include are shifted from a hitherto predominant CRT to a liquid crystal display having large advantages of low-profile and lightweight design and low power consumption. Applications of the liquid crystal display are widely spread not only to television sets and desktop personal computers but also to onboard navigation systems, instruments for use indoors and outdoors and the like. Liquid crystal displays currently becoming widespread have polarizers having functions to transmit and shield light and retardation films including a liquid crystal layer having a photonic switching function as elementary components, and in addition a hard coated layer for protecting a surface, an antireflection film and the like are added.

When the polarizer is fabricated, a polarizing film is first fabricated generally by stretching (uniaxial stretching) a polyvinyl alcohol-based film which has been swelled, then dyeing (or uniaxially stretching after or during dyeing) and fixing a dyeing agent with a borate compound. And, by bonding a protective film such as a triacetyl cellulose film to the fabricated polarizing film, the polarizer is fabricated. In addition, the above-mentioned dyeing and fixing may be simultaneously applied. Further, the above-mentioned stretching includes wet stretching in which stretching is carried out in a liquid and dry stretching in which stretching is carried out in a gas.

Here, color irregularities produced because of existence of variations in optical properties over the whole area of the polarizing film are often present in the polarizing film. As a specific reason why these color irregularities occur, various factors are thought, but it is difficult to ascertain the reason unless the polarizing film is in a state of bonding a protective film such as a triacetyl cellulose film to the polarizing film. When a defect of quality due to color irregularities of the polarizing film is observed in a state of bonding a protective film, the polarizing film is discarded as defectives together with the protective film, and therefore the yield of a material will be largely deteriorated.

As a method of improving these color irregularities, for example, in Japanese Unexamined Patent Publication No. 2004-78208, there is proposed a method in which the length of a dyeing bath in which dyeing is carried out is changed and a dyeing time is controlled, and this allows the dyeing irregularities of the polarizing film to decrease.

However, polarizing films having a large area are required in large amounts with the upsizing of the liquid crystal display in recent years. When an area of the polarizing film becomes large, the evenness of optical properties over the whole area of the polarizing film is required or a combined use with another films such as a retardation film which corrects an angle of view becomes often, and therefore the problem of color irregularities becomes significant and a requirement for fabricating the films in a short time (short delivery times) is increasing. If a current processing speed of the overall manufacturing process is increased in respond to the requirement for fabricating the films in a short time, there are problems that color irregularities are apt to occur and its yield is largely deteriorated. On the other hand, in accordance with the method described in the above-mentioned Unexamined Patent Publications, the color irregularities can be reduced as described above, but it is necessary to extend considerably a dyeing time by decreasing a carrying speed of the polarizing film or lengthening the length of a dyeing bath in order to respond to the polarizing film having a large area, and there is a problem that the requirement of fabricating the polarizing films in a short time cannot be met.

DISCLOSURE OF THE INVENTION

The present invention has been made in order to resolve these problems of the prior art, and it is an object of the present invention to provide a method of fabricating a polarizing film enabling to fabricate a polarizing film having low color irregularities and high quality in a short time.

In order to resolve the above-mentioned problems, the present inventors made earnest investigations, and consequently they thought a method of installing at least two swelling baths in which a resin film is immersed in a swelling step and using the steps of immersing the resin film in a bath liquid in a swelling bath positioned on the front-stage side and then immersing the resin film in a bath liquid in a swelling bath positioned on the rear-stage side in sequence. And, it was found that when at least a bath temperature of a swelling bath located at a Nth position from the front-stage side is set at a temperature which is higher than a bath temperature of a swelling bath located at a (N+M)th position by 3° C. or more (both N and M are specified positive integers), the swelling of the resin film is apt to proceed in a bath liquid of elevated temperature in the Nth swelling bath and the time that elapsed before an amount of swelling of the resin film reaches a saturated state is shortened. Consequently, it was found that the time involved in the swelling step, and by extension to the time involved in fabricating the polarizing film could be reduced. And, it was found that since the swelling of the resin film proceeds in a bath liquid in the Nth swelling bath, the swelling of the resin film in a bath liquid in a dyeing bath of the following dyeing step is suppressed, and consequently a polarizing film having low color irregularities and high quality can be obtained. The present invention has been completed based on these findings found by these inventors of the present invention.

That is, the present invention provide a method of fabricating a polarizing film by uniaxially stretching a resin film such as a polyvinyl alcohol-based film in a fabrication process including a swelling step and a dyeing step following the swelling step, comprising the steps of immersing a resin film in bath liquids in at least two or more swelling baths in sequence in the above-mentioned swelling step, wherein at least a bath temperature of a swelling bath located at a Nth position from the front-stage side is set at a temperature which is higher than a bath temperature of a swelling bath located at a (N+M)th position by 3° C. or more (both N and M are specified positive integers).

In addition, a "swelling step" in the present invention is a step at the stage before the dyeing step, and it means a broad concept including all steps in which the resin film is immersed in a bath liquid (stretching may be simultaneously carried out). And, a "swelling bath" in the present invention is a swelling bath positioned at the stage before the dyeing bath used in the dyeing step, and it means a broad concept including all baths in which the resin film is immersed in a bath liquid (stretching may be simultaneously carried out). For example, when a wet stretching step is provided at the stage before the dyeing step, this wet stretching step corresponds to the "swelling step" in the present invention and a stretching bath used in the above wet stretching step corresponds to the "swelling bath" in the present invention. Therefore, in the stretching bath used in the above wet stretching step, the stretching and the swelling are carried out in the same bath liquid. And, when the resin film is subjected to fixing in a step at the stage before the dyeing step, this fixing step corresponds to the "swelling step" in the present invention. And, a fixing bath used in the above fixing step corresponds to the "swelling bath" in the present invention, and in this fixing bath, the fixing and the swelling are carried out in the same bath liquid.

And, in the present invention, in order to swell the resin film in a shorter time and to furthermore reduce the time involved in the swelling step, it is preferred to set a bath temperature of a swelling bath located at a Nth position at a temperature which is higher than a bath temperature of a swelling bath located at a (N+M)th position by 5° C. or more.

The method of fabricating a polarizing film of the present invention preferably comprises the steps of immersing the resin film in a bath liquid in a first swelling bath and then immersing the resin film in a bath liquid in a second swelling bath following the above-mentioned first swelling bath in the above-mentioned swelling step, and a bath temperature of the above first swelling bath is set at a temperature which is higher than a bath temperature of the above second swelling bath by 3° C. or more.

In addition, in the present invention, if bath temperatures of the respective swelling baths are set at a temperature of higher than 55° C., the resin film may become too soft and break. On the other hand, if bath temperatures of the respective swelling baths are set at a temperature of lower than 20° C., it becomes necessary to cool a bath liquid and a burden on facility increases and in addition to this, the swelling of the resin film become hard to proceed. Therefore, in order not to cause the above problems, it is preferred to set the above-mentioned bath temperatures of the respective swelling baths at a temperature of 20° C. or higher and 55° C. or lower.

And, it is preferred to set a bath temperature of a dyeing bath in which the resin film is immersed at a temperature of 20° C. or higher and 50° C. or lower in the above-mentioned dyeing step. Further, this set temperature is more preferably 20° C. or higher and 45° C. or lower and particularly preferably 25° C. or higher and 40° C. or lower. When the bath temperature of a dyeing bath is too high, a concentration of a dichroic substance in the bath liquid becomes apt to change due to the sublimation of iodine or the evaporation of a solvent, and therefore it becomes difficult to maintain the quality of dyeing.

Further, it is preferred to set the difference between a bath temperature of a swelling bath positioned just before a dyeing bath used in the above dyeing step and a bath temperature of the above dyeing bath at a temperature differential of 5° C. or lower. In accordance with such a preferred configuration, since the bath temperature of the swelling bath positioned just before the dyeing bath becomes close to the bath temperature of the dyeing bath, the swelling of the resin film in the bath liquid in the dyeing bath is furthermore suppressed, and a polarizing film having furthermore low color irregularities and high quality can be obtained.

In the present invention, when the total of the time of the immersion of the resin film in a bath liquid in the above respective swelling baths is 50 seconds or less, the time involved in fabricating the polarizing film can be remarkably reduced, and also a polarizing film having adequately low color irregularities and high quality can be obtained even in such a short immersion time.

And, in order to attain higher optical properties, it is preferred to use, for example, a film, in which it is specified that a saponification degree is 95% or more and a polymerization degree is 2000 or more, as the above-mentioned resin film.

And, the present invention is also provided as a polarizing film having a polarization degree of 99.95% or more, which is fabricated employing the above fabrication method.

And, the present invention is also provided as a polarizer including a polarizing film which is fabricated employing the above fabrication method.

And, the present invention is also provided as an optical film formed by laminating a polarizing film which is fabricated employing the above fabrication method.

Further, the present invention is also provided as an image display device including the above polarizer or the above optical film.

In accordance with the method of fabricating a polarizing film concerning the present invention, the time that elapsed before an amount of swelling of the resin film reaches a saturated state is reduced, and consequently the time involved in the swelling step, and by extension to the time involved in fabricating the polarizing film can be reduced and also a polarizing film having low color irregularities and high quality can be obtained.

BEST MODE FOR CARRYING OUT THE INVENTION

Figure 1:
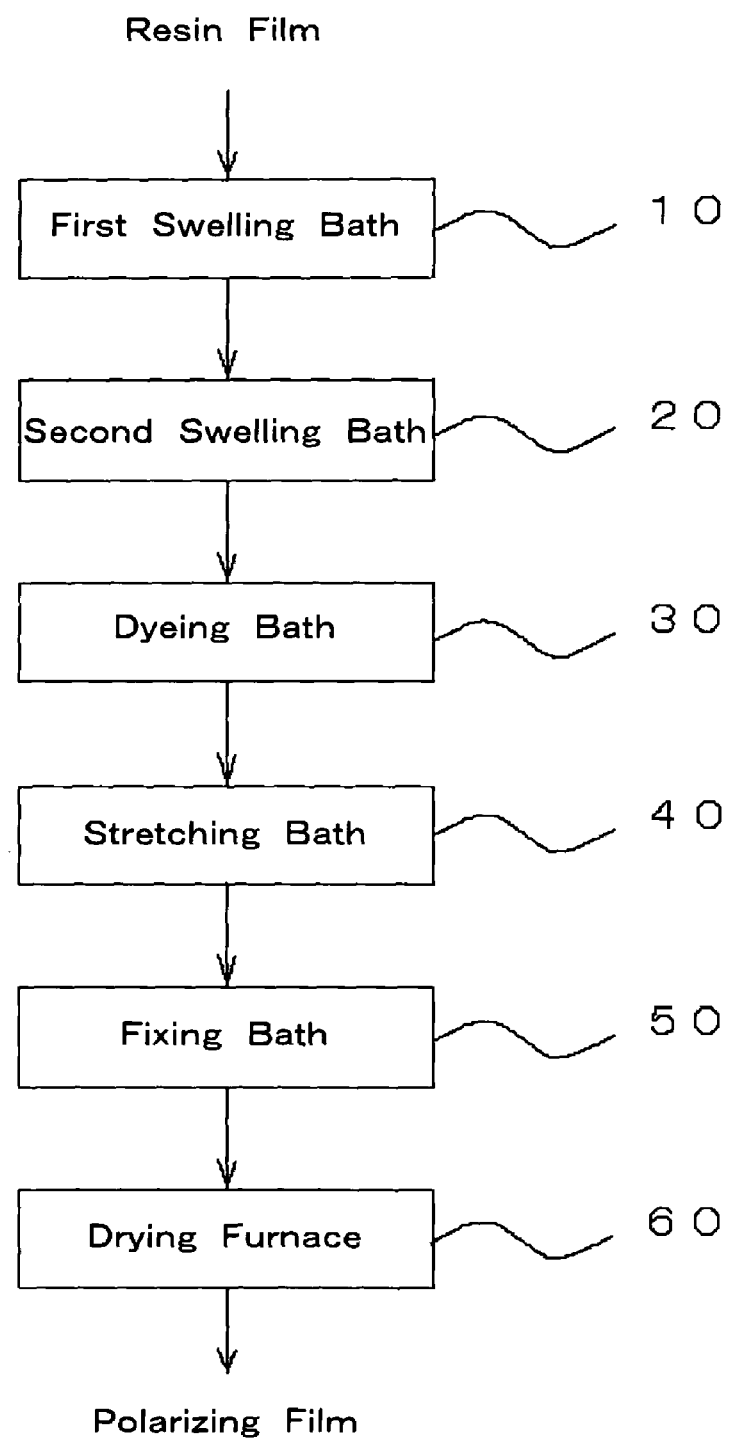
FIG. 1 is a block diagram schematically showing a production line for practicing a method of fabricating a polarizing film concerning an embodiment of the present invention.

Hereinafter, an embodiment of the present invention will be described taken in conjunction with accompanying drawings FIG. 1 is a block diagram schematically showing a production line for practicing a method of fabricating a polarizing film concerning an embodiment of the present invention. As shown in FIG. 1, the production line concerning the present embodiment includes a first swelling bath 10, a second swelling bath 20, a dyeing bath 30, a stretching bath 40, a fixing bath 50 and a drying furnace 60. When the polarizing film is fabricated on the production line concerning the present embodiment, a resin film is first carried to the first swelling bath 10 and then to the second swelling bath 20.

As a resin film concerning the present invention, a polyvinyl alcohol-based film is employed. Examples of the polyvinyl alcohol-based films can include a polyvinyl alcohol film, a polyvinyl formal film, a polyvinyl acetal film, a poly-co-polymer film, a film of a partially saponified polymer thereof and a film of a partially polyene oriented polyvinyl alcohol. Further, a resin film concerning the present invention is not limited to a polyvinyl alcohol-based film, and as the resin film, polyethylene terephthalate-based films, ethylene-vinyl acetate copolymer-based films, and cellulose-based films can be exemplified.

A polyvinyl alcohol-based film is immersed in a bath liquid (pure water treated with a reverse osmosis membrane in the present embodiment) in a first swelling bath 10 and subsequently immersed in a bath liquid (pure water treated with a reverse osmosis membrane in the present embodiment) in a second swelling bath 20. Here, a bath temperature of the first swelling bath 10 is set at a temperature which is higher than a bath temperature of the second swelling bath 20 by 3° C. or more (that is, (bath temperature of the first swelling bath 10)−(bath temperature of the second swelling bath 20)≧3° C.). And, in a preferred configuration, bath temperatures of the first swelling bath 10 and the second swelling bath 20 are set at a temperature of 20° C. or higher and 55° C. or lower, respectively. Further, it is more preferred to set the difference between this bath temperature of the first swelling bath 10 and this bath temperature of the second swelling bath 20 at a temperature differential of 5° C. or more, and it is preferred to set the temperature differential below about 30° C. because the adjustment of film tension becomes difficult when the temperature differential is too large. And, in the first swelling bath 10 and the second swelling bath 20 concerning the present embodiment, not only the swelling but also the stretching is applied, and a draw ratio of the resin film is preferably taken as about 1.1 to 3.5 in overall two baths including elongation due to swelling. Water such as pure water is generally employed as a bath liquid used in the swelling bath, but a solution containing an iodide or an additive such as a crosslinking agent may be used.

In the present embodiment, an aspect of immersing a resin film in bath liquids in two swelling baths 10, 20 in sequence has been described, but the present invention is not limited to this aspect, and an aspect of immersing a resin film in bath liquids in three or more swelling baths in sequence can be adopted. In this case, at least a bath temperature of a swelling bath located at a Nth position from the front-stage side is set at a temperature which is higher than a bath temperature of a swelling bath located at a (N+M)th position by 3° C. or more (both N and M are specified positive integers). For example, if N=1 and M=2, this means that a bath temperature of at least first swelling bath is set at a temperature which is higher than a bath temperature of a third swelling bath by 3° C. or more, and a bath temperature of a second swelling bath or a bath temperature of a fourth or more swelling bath is not limited. In other words, bath temperatures of the respective swelling baths may be set in such a way that at least a set of combination, in which (bath temperature of the swelling bath on the front-stage side)−(bath temperature of the swelling bath on the rear-stage side)≧3° C., exists among a plurality of combinations of the swelling baths on the front-stage side and the swelling baths positioned at the stage posterior to the swelling baths on the front-stage side, which are used in the swelling step.

Next, the film swelled in the first swelling bath 10 and the second swelling bath 20 is carried to a dyeing bath 30. As a bath liquid in the dyeing bath 30, a solution formed by dissolving a dichroic substance as a dye in a solvent can be used, and by immersing the above film in this solution, dyeing is carried out. As a dichroic substance, for example, iodine and organic dye can be exemplified. These substances with dichroism may be used singly or in combination of two or more species. When iodine is used as the above dichroic substance, it is preferred to add an iodide such as potassium iodide for furthermore improving dyeing efficiency. As the above solvent, water is generally used, but an organic solvent having the compatibility with water may be further added. In the present embodiment, an aspect of applying dyeing using the dyeing bath 30 has been described, but the present invention is not limited to this aspect, and it is also possible to prepare a polyvinyl alcohol-based film by mixing a dye directly in a polyvinyl alcohol-based material.

Next, the film dyed in the dyeing bath 30 is carried to a stretching bath 40 and stretched in a uniaxial direction. As a bath liquid in a stretching bath 40, for example, a solution to which various metal salts, or an iodine, boron or zinc compound is added can be used, and particularly a solution to which boric acid and/or potassium iodide is added in a amount about 2 to 10% by weight is preferably used. As a solvent of such a solution, water, ethanol or various organic solvents can be appropriately used. A draw ratio of the resin film in the stretching bath 40 is preferably taken as about 1.1 to 5, a cumulative draw ratio including the draw ratio obtained in the antecedent step is preferably taken as about 1.1 to 7 (more preferably taken as 3 to 7 and particularly preferably taken as 5.3 to 6.5). In addition, in the present embodiment, an aspect of uniaxially stretching after dyeing has been described, but the present invention is not limited to this aspect, and it is also possible to adopt the aspect in which the stretching bath 40 is installed at the stage antecedent to (upstream in a film transfer direction) the dyeing bath 30 (that is, the stretching bath 40 is installed just after the second swelling bath 20), and the resin film is subjected to uniaxial stretching and then subjected to dyeing. Also, it is possible to adopt the aspect in which stretching is carried out concurrently with another operation such as the aspect in which stretching is carried out concurrently with dyeing in the dyeing bath 30 without installing the stretching bath 40 separately.

Next, the film stretched in the stretching bath 40 is carried to a fixing bath 50 and subjected to fixing for sustaining an effect of dyeing a film by being immersed in a bath liquid in the fixing bath 50. As a bath liquid in a fixing bath 50, water or a solution formed by dissolving a boric acid compound in a solvent further including an organic solvent having the compatibility with water can be used and in addition sodium iodide or potassium iodide may be added.

Finally, the film fixed in the fixing bath 50 is carried to a drying furnace 60, and dried with hot air of preferably 30° C. to 150° C. and more preferably 50° C. to 150° C., and sent out as a polarizing film.

In accordance with the fabrication method described above, since a bath temperature of the first swelling bath 10 is set at a temperature which is higher than a bath temperature of the second swelling bath 20 by 3° C. or more, the swelling of the resin film is apt to proceed in a bath liquid in the first swelling bath 10 and the time that elapsed before an amount of swelling of the resin film reaches a saturated state is reduced, and consequently the time involved in the swelling step, and by extension to the time involved in fabricating the polarizing film can be reduced. And, since the swelling of the resin film proceeds in a bath liquid in the first swelling bath 10, the swelling of the resin film in a bath liquid in the following dyeing bath 30 is suppressed, and consequently a polarizing film having low color irregularities and high quality can be obtained. And, by setting bath temperatures of the first swelling bath 10 and the second swelling bath 20 at a temperature of 20° C. or higher and 55° C. or lower, respectively, the resin film does not become too soft and a problem of breaking does not occur, and on the other hand there are advantages that since cooling of a bath liquid is unnecessary, a burden on facility does not arise, and in addition the swelling of the resin film become apt to proceed.

Further, the polarizing film thus fabricated is processed into a polarizer by usually bonding a protective film without retardation, which is optically transparent and has mechanical strength, to on both sides or one side of the polarizing film. As such a protective film, a triacetyl cellulose film is suitably used.

And, the polarizing film (or the polarizer) thus fabricated can also be used in the form of an optical film formed by laminating various optical layers on the occasion of practical use. As such an optical layer, there can be exemplified, for example, a hard coated layer aimed to prevent a surface flaw of a polarizing film, an antireflection layer aimed to prevent the reflection of external light at the surface of a polarizing film, an anti-sticking layer aimed to prevent the adhesion to an adjacent layer, a diffusing layer for enlarging an angle of view by diffusing transmitted light of a polarizing film and an antiglare layer which is provided with fine projections and depressions structure for the purpose of preventing the reflection of external light at the surface of a polarizing film. Additionally, this polarizing film can also be used in the form of an optical film formed by bonding one, or two or more of layers such as a reflector plate, a semi-transmissive plate, a retardation plate (including half-wavelength plate, quarter-wavelength plate), a visual compensation film and a brightness improving film.

And, the polarizer or the optical film concerning the present embodiment can be preferably used as components constituting various image display devices from a liquid crystal display through an organic EL display to PDP. For example, as for a liquid crystal display, it is possible to form an appropriate constitution in conformance with conventional constitution such as a transmissive type, a reflective type or transmissive-reflective dual type which is formed by arranging the above optical film or the like on one side or both sides of a liquid crystal cell. A type of the liquid crystal cell composing of the liquid crystal display is arbitrary, and an appropriate type of a liquid crystal cell such as an active matrix driving type liquid crystal cell, typified by a thin film transistor, may be used. And when the optical film concerning the present embodiment is installed on both sides of the liquid crystal cell, the optical films on both sides may be the same one or different ones. Further, on the occasion of constructing the liquid crystal display, one or more layers of appropriate components such as a prism array sheet, a lens array sheet, a diffusing plate and a backlight may be arranged at appropriate locations.

Hereinafter, the features of the present invention will be furthermore obvious by way of examples and comparative examples.

Example 1

A polarizing film was fabricated on a production line shown in FIG. 1 using a polyvinyl alcohol film (polymerization degree 2400) produce by KURARAY CO., LTD., in which it is specified that a saponification degree is 95% or more and a polymerization degree is 2000 or more, as a resin film. In a first swelling bath 10 and a second swelling bath 20, both of which use pure water treated with a reverse osmosis membrane as a bath liquid, not only the swelling but also the stretching was applied, and a draw ratio of the resin film was taken as 2.7 (a draw ratio of a first swelling bath 10 was 2 and a draw ratio of a second swelling bath 20 was 1.35) in overall two baths. A bath temperature of the first swelling bath 10 was set at 40° C., and the time of immersion in the bath liquid was set at most at 21 seconds. Further, the film was pulled out of the first swelling bath 10 every specified immersion time and its swelling distortion described later was measured. A bath temperature of the second swelling bath 20 was set at 28° C., and the time of immersion in the bath liquid was set at most at 64 seconds. The film was also pulled out of the second swelling bath 20 every specified immersion time and its swelling distortion described later was measured. As a bath liquid in a dyeing bath 30, a solution of 30° C. formed by dissolving iodine in concentrations of 1 g/l in pure water treated with a reverse osmosis membrane as a solvent was used. As a bath liquid in a stretching bath 40, there was used a solution of 50° C. formed by adding boric acid to pure water as a solvent so as to be 4% by weight. The film was uniaxially stretched at a draw ratio of 1.5. As a bath liquid in a fixing bath 50, there was used a solution of room temperature formed by adding potassium iodide to pure water as a solvent so as to be 5% by weight. In a drying furnace 60, the film was dried with hot air of 60° C.

Example 2

A polarizing film was fabricated under the same conditions as in Example 1 except for setting a bath temperature of a first swelling bath 10 at 50° C.

Example 3

A polarizing film was fabricated under the same conditions as in Example 1 except for setting the time of the immersion in a bath liquid in a first swelling bath 10 at most at 10 seconds, a bath temperature of a second swelling bath 20 at 30° C. and the time of the immersion in a bath liquid in the second swelling bath 20 at most at 32 seconds.

Example 4

A polarizing film was fabricated under the same conditions as in Example 3 except for setting a bath temperature of a first swelling bath 10 at 35° C.

Example 5

A polarizing film was fabricated under the same conditions as in Example 1 except for setting the time of the immersion in a bath liquid in a second swelling bath 20 at most at 10 seconds.

Example 6

A polarizing film was fabricated under the same conditions as in Example 2 except for setting the time of the immersion in a bath liquid in a second swelling bath 20 at most at 10 seconds.

Example 7

A polarizing film was fabricated under the same conditions as in Example 3 except for setting the time of the immersion in a bath liquid in a first swelling bath 10 at most at 17 seconds and the time of the immersion in a bath liquid in a second swelling bath 20 at most at 11 seconds.

Comparative Example 1

A polarizing film was fabricated under the same conditions as in Example 1 except for using only one bath as a swelling bath (stretching is also carried out in this bath) and setting a bath temperature of the bath at 28° C. and the time of the immersion in a bath liquid in the bath at most at 155 seconds.

Comparative Example 2

A polarizing film was fabricated under the same conditions as in Example 1 except for using only one bath as a swelling bath (stretching is also carried out in this bath) and setting a bath temperature of the bath at 40° C. and the time of the immersion in a bath liquid in the bath at most at 155 seconds.

Comparative Example 3

A polarizing film was fabricated under the same conditions as in Example 1 except for using only one bath as a swelling bath (stretching is also carried out in this bath) and setting a bath temperature of the bath at 50° C. and the time of the immersion in a bath liquid in the bath at most at 155 seconds.

Comparative Example 4

A polarizing film was fabricated under the same conditions as in Example 3 except for setting a bath temperature of a first swelling bath 10 at 30° C.

Comparative Example 5

A polarizing film was fabricated under the same conditions as in Example 1 except for using only one bath as a swelling bath (stretching is also carried out in this bath) and setting a bath temperature of the bath at 40° C. and the time of the immersion in a bath liquid in the bath at most at 40 seconds.

Comparative Example 6

A polarizing film was fabricated under the same conditions as in Example 1 except for using only one bath as a swelling bath (stretching is also carried out in this bath) and setting a bath temperature of the bath at 30° C. and the time of the immersion in a bath liquid in the bath at most at 40 seconds.

Comparative Example 7

A polarizing film was fabricated under the same conditions as in Example 1 except for setting a bath temperature of a first swelling bath 10 at 30° C. and the time of the immersion in a bath liquid in the first swelling bath 10 at most at 32 seconds, and setting a bath temperature of a second swelling bath 20 at 35° C. and the time of the immersion in a bath liquid in the second swelling bath 20 at most at 10 seconds.

Incidentally, the bath temperatures of the swelling baths shown in Examples 1 to 7 and Comparative Examples 1 to 7 were measured by the following method. That is, thermocouples were installed at a plurality of points (3 points spaced at approximately regular intervals along the direction of the width of the swelling bath, 3 points spaced at approximately regular intervals along the direction of the length, and 3 points spaced at approximately regular intervals along the direction of the depth, therefore a total of 27 points) in the bath liquid in the swelling bath, and an average value of temperatures measured for a specified time with the thermocouples installed at the respective points was considered as a bath temperature.

<Results of Evaluation 1>

Figure 2:
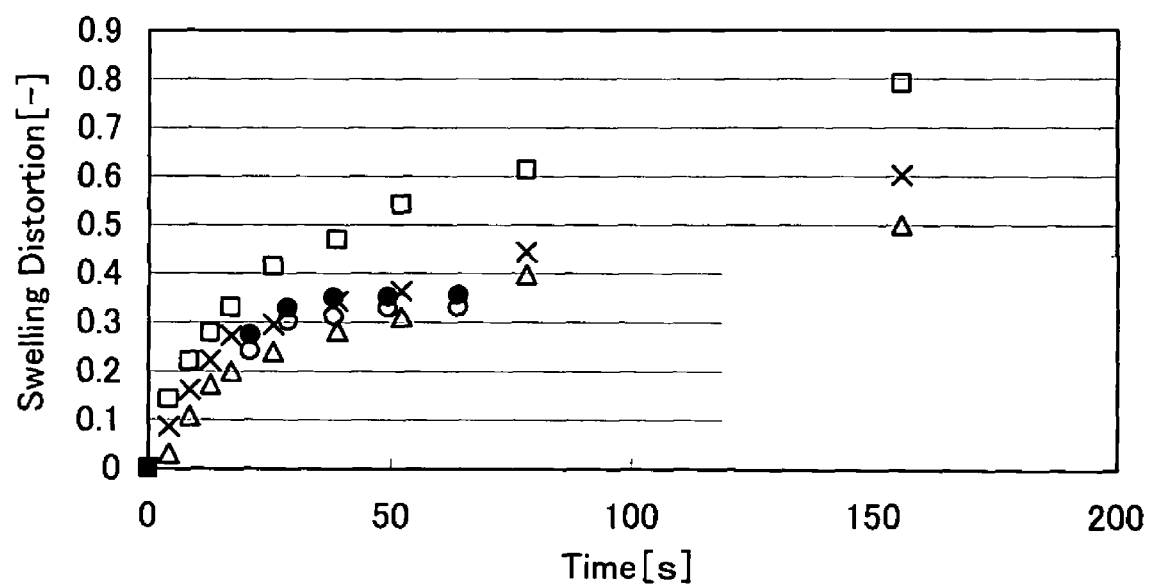
FIG. 2 is a graph showing a relationship between an immersion time in swelling baths and a swelling distortion on swelling concerning an example of the present invention.

The relationship between an immersion time in swelling baths and a swelling distortion was investigated on Examples 1 to 2 and Comparative Examples 1 to 3. The results of the investigations are shown in FIG. 2. A lateral axis of FIG. 2 is an immersion time, and for Examples 1 and 2, it represents the total of the immersion times in the first swelling bath 10 and the second swelling bath 20 (the total does not include the time that elapsed before the immersion in the second swelling bath 20 starts after the immersion in the first swelling bath 10 is completed). On the other hand, for Comparative Examples 1 to 3, it represents an immersion time in one swelling bath. Further, a vertical axis of FIG. 2 represents a swelling distortion.

Herein, the term a swelling distortion refers to the value obtained by measuring the difference between the width of a film calculated assuming that the behavior of deformation in the case of stretching a film is affine deformation (that is, assuming that the volume of a film is constant before and after stretching) and the width of a film actually measured after stretching in the swelling bath, and dividing the measured difference by the width of a not-yet-stretched film. A state of the swelling of a film can be evaluated by this swelling distortion determined. That is, it is possible to consider the amount of swelling of the film to be saturated when a measurement value of the swelling distortion does not change even by changing the time during which the resin film is subjected to the swelling (the time of the immersion in the bath liquid in the swelling baths).

As shown in FIG. 2, in Examples 1 and 2, the time that elapsed before an amount of swelling of the resin film reaches a saturated state (before the value of the swelling distortion does not change) is reduced compared with Comparative Examples 1 to 3 (in Comparative Examples 1 to 3, the amount of swelling did not reach a saturated state even by setting an immersion time at the longest time), and consequently it was found that the time involved in the swelling step, and by extension to the time involved in fabricating the polarizing film can be reduced).

<Results of Evaluation 2>

A polarization degree and color irregularities (appearance) of the polarizing film obtained in the case of setting an immersion time at the longest time were evaluated on each of Examples 1 to 7 and Comparative Examples 1 to 7. The results of evaluations are shown in Table 1. Further, the totals of the immersion times of the resin film in the swelling baths are shown together in Table 1. Here, the polarization degree was measured on each sample having a size of 25 mm×40 mm, which is cut off from the fabricated polarizing films, using a spectrophotometer DOT-3C manufactured by Murakami Color Research Laboratory Co., Ltd. And, the color irregularities were evaluated by placing the above sample on a polarizer for observation in such a way that the polarization axes of the sample and the polarizer are orthogonal to each other and observing the uniformity of the color irregularities through irradiating the sample with a fluorescent lamp of three wavelengths. More specifically, first, the above sample was irradiated with the above fluorescent lamp, transmitted light was imaged by a camera, and the images imaged were subjected to image processing to determine the distribution of brightness in the direction of the width of the sample. Next, the determined distribution of brightness (a lateral axis: distance, a vertical axis: brightness) was considered as a roughness curve, and a arithmetic mean roughness (Ra) was determined, and the color irregularities was converted into numbers in the form of this Ra. And, it was thought that when the Ra is small, unevenness of the distribution of brightness is small and appearances are good.

TABLE 1

| | First Swelling Bath | | Second Swelling Bath | | Total of | | |
| --- | --- | --- | --- | --- | --- | --- | --- |
| | Bath Temperature (° C.) | Immersion Time (sec) | Bath Temperature (° C.) | Immersion Time (sec) | immersion times in swelling baths (sec) | Polarization Degree | Color Irregularities (Appearance) |
| Example 1 | 40 | 21 | 28 | 64 | 85 | 99.97 | Good |
| Example 2 | 50 | 21 | 28 | 64 | 85 | 99.98 | Good |
| Example 3 | 40 | 10 | 30 | 32 | 42 | 99.95 | Good |
| Example 4 | 35 | 10 | 30 | 32 | 42 | 99.96 | Good |
| Example 5 | 40 | 21 | 28 | 10 | 31 | 99.95 | Good |
| Example 6 | 50 | 21 | 28 | 10 | 31 | 99.96 | Good |
| Example 7 | 40 | 17 | 30 | 11 | 28 | 99.98 | Good |
| Comparative Example 1 | 28 | 155 | — | — | 155 | 99.97 | Good |
| Comparative Example 2 | 40 | 155 | — | — | 155 | 99.98 | Good |
| Comparative Example 3 | 50 | 155 | — | — | 155 | 99.98 | Good |
| Comparative Example 4 | 30 | 10 | 30 | 32 | 42 | 99.93 | Occurrence of color irregularities |
| Comparative Example 5 | 40 | 40 | — | — | 40 | 99.93 | Occurrence of color irregularities |
| Comparative Example 6 | 30 | 40 | — | — | 40 | 99.93 | Occurrence of color irregularities |
| Comparative Example 7 | 30 | 32 | 35 | 10 | 42 | 99.93 | Occurrence of color irregularities |

As shown in Table 1, polarization degrees and color irregularities in Examples 1 to 7 showed good results, and it was found that in these cases, a polarizing film having low color irregularities and high quality can be obtained. Further, Example 5 represents the case where the immersion time of the second swelling bath in Example 1 is shortened and Example 6 represents the case where the immersion time of the second swelling bath in Example 2 is shortened, but it was found that a polarizing film having adequately low color irregularities and high quality can be obtained even in a short immersion time like these examples. Particularly in Example 7, even though the total of the immersion times in the first swelling bath 10 and the second swelling bath 20 was an extremely short time of 28 seconds, a polarizing film having adequately low color irregularities and high quality could be obtained, and the time involved in fabricating the polarizing film could be remarkably reduced without impairing the quality of the polarizing film.

On the other hand, in the polarizing films of Comparative Examples 1 to 3, the amount of swelling did not reach a saturated state, but the rate of changes of the swelling distortion per unit time became relatively small by setting an immersion time at the longest time (155 seconds) (refer to FIG. 2). Therefore, it is thought that the resin film was resistant to re-swelling when immersing the film in the bath liquid in the dyeing bath following the swelling bath and a polarizing film having low color irregularity was obtained. However, since the polarizing films of Comparative Examples 1 to 3 require a longer immersion time in the swelling bath than that of Examples 1 to 7, the problem that the time involved in fabricating the polarizing film cannot be reduced remains. On the other hand, it was found that when the total of the immersion times in the swelling baths is set at a short time like Comparative Examples 4 to 7 (particularly, in Comparative Examples 4 and 7, the bath temperature of the second swelling bath was set at a higher temperature than that of the first swelling bath in addition to setting the total of the immersion times at a short time) from the viewpoint of reducing the time involved in fabricating the polarizing film, the resin film is re-swelled in immersing the film in the bath liquid in the dyeing bath following the swelling bath and the color irregularities of dyeing occurs.

The invention claimed is:

1. A method of fabricating a polarizing film by uniaxially stretching a resin film in a fabrication process including a swelling step and a dyeing step following the swelling step, comprising the steps of immersing the resin film in bath liquids in at least two or more swelling baths in sequence in said swelling step,
wherein at least a bath temperature of a swelling bath located at a Nth position from the front-stage side is set at a temperature which is higher than a bath temperature of a swelling bath located at a (N+M)th position by 3° C. or more (both N and M are specified positive integers).

2. The method of fabricating a polarizing film according to claim 1, comprising the steps of immersing a resin film in a bath liquid in a first swelling bath and then immersing the resin film in a bath liquid in a second swelling bath following said first swelling bath in said swelling step,
wherein a bath temperature of said first swelling bath is set at a temperature which is higher than a bath temperature of said second swelling bath by 3° C. or more.

3. The method of fabricating a polarizing film according to claim 1, wherein bath temperatures of said respective swelling baths are set at a temperature of 20° C. or higher and 55° C. or lower.

4. The method of fabricating a polarizing film according to claim 1, wherein a bath temperature of a dyeing bath in which the resin film is immersed is set at a temperature of 20° C. or higher and 50° C. or lower in said dyeing step.

5. The method of fabricating a polarizing film according to claim 1, wherein the difference between a bath temperature of a swelling bath positioned just before a dyeing bath used in said dyeing step and a bath temperature of said dyeing bath is set at a temperature differential of 5° C. or lower.

6. The method of fabricating a polarizing film according to claim 1, wherein the total of the time of the immersion of the resin film in a bath liquid in said respective swelling baths is 50 seconds or less.

7. The method of fabricating a polarizing film according to claim 1, wherein as for said resin film, it is specified that a saponification degree is 95% or more and a polymerization degree is 2000 or more.

8. The method of fabricating a polarizing film according to claim 1, wherein said resin film is a polyvinyl alcohol-based film.

* * * * *